(12) United States Patent
Li et al.

(10) Patent No.: US 11,870,921 B2
(45) Date of Patent: Jan. 9, 2024

(54) STORAGE CARD

(71) Applicant: Huawei Technologies Co., Ltd., Shenzhen (CN)

(72) Inventors: Zhongzheng Li, Shenzhen (CN); Wei Gao, Shenzhen (CN); Jian Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 346 days.

(21) Appl. No.: 17/311,203

(22) PCT Filed: Jul. 17, 2019

(86) PCT No.: PCT/CN2019/096440
§ 371 (c)(1),
(2) Date: Jun. 4, 2021

(87) PCT Pub. No.: WO2020/113965
PCT Pub. Date: Jun. 11, 2020

(65) Prior Publication Data
US 2022/0014612 A1    Jan. 13, 2022

(30) Foreign Application Priority Data
Dec. 6, 2018 (CN) .......................... 201822049513.8

(51) Int. Cl.
*H04M 1/02* (2006.01)
*G06K 7/00* (2006.01)
*G06K 19/077* (2006.01)
*H04B 1/3816* (2015.01)

(52) U.S. Cl.
CPC ........ *H04M 1/0274* (2013.01); *G06K 7/0039* (2013.01); *G06K 19/07732* (2013.01); *H04B 1/3816* (2013.01)

(58) Field of Classification Search
CPC .................................................. H04M 1/0274
See application file for complete search history.

(56) References Cited

U.S. PATENT DOCUMENTS 6,062,887 A * 5/2000 Schuster .............. G06K 7/0052
439/218
2007/0032122 A1    2/2007 Wang
2007/0228509 A1    10/2007 Okada et al.
(Continued)

FOREIGN PATENT DOCUMENTS

CN    1744110 A    3/2006
CN    1889260 A    1/2007
(Continued)

*Primary Examiner* — Hsinchun Liao
(74) *Attorney, Agent, or Firm* — Slater Matsil, LLP

(57) ABSTRACT

A storage card is capable of sharing a card slot with a standard SIM card. A missing corner edge used for defining a mistake-proof missing corner is disposed on each of the storage card and the standard SIM card. When another edge of the storage card overlaps another edge of the standard SIM card, at least a part of the missing corner edge of the storage card is located on an outer side of a projection line that is of the missing corner edge of the standard SIM card and that is on the storage card. A storage wafer is disposed in the storage card, and a vertex angle of the storage wafer falls between the missing corner edge of the storage card and the projection line.

20 Claims, 3 Drawing Sheets

(56) References Cited

U.S. PATENT DOCUMENTS

| | | | |
|---|---|---|---|
| 2011/0134620 A1 | 6/2011 | Kang et al. | |
| 2016/0014280 A1* | 1/2016 | Brunsman | H04L 63/0272 |
| | | | 455/418 |
| 2017/0154003 A1 | 6/2017 | Han et al. | |

FOREIGN PATENT DOCUMENTS

| | | |
|---|---|---|
| CN | 204143475 U | 2/2015 |
| CN | 104485548 A | 4/2015 |
| CN | 207965941 U | 10/2018 |
| EP | 3252677 A1 | 12/2017 |
| KR | 20010046878 A | 6/2001 |

* cited by examiner

STORAGE CARD

CROSS-REFERENCE TO RELATED APPLICATIONS

This application is a National Stage of International Application No. PCT/CN2019/096440, filed on Jul. 17, 2019, which claims priority to Chinese Patent Application No. 201822049513.8, filed on Dec. 6, 2018. The disclosures of the aforementioned applications are hereby incorporated by reference in their entireties.

TECHNICAL FIELD

Disclosed embodiments of this application relate to the field of storage technologies, and more specifically, to a storage card.

BACKGROUND

A SIM card is a Subscriber Identification Module and is also referred to as a subscriber identity card or a smart card. A GSM digital mobile phone can be used only after being installed with the card. An SD storage card is a next-generation memory device based on a semiconductor flash memory, and is widely used in portable apparatuses because of excellent characteristics of the SD storage card such as a small volume, a fast data transmission speed, and hot-swappability.

As mobile terminals develop, currently, two card slots are generally disposed in one card tray, and both a SIM card and an SD card may be installed.

SUMMARY

According to a first aspect of this application, a storage card is provided. The storage card is capable of sharing a card slot with a standard SIM card. A missing corner edge used for defining a mistake-proof missing corner is disposed on each of the storage card and the standard SIM card. When another edge of the storage card overlaps another edge of the standard SIM card, at least a part of the missing corner edge of the storage card is located on an outer side of a projection line that is of the missing corner edge of the standard SIM card and that is on the storage card. A storage wafer is disposed in the storage card, and a vertex angle of the storage wafer falls between the missing corner edge of the storage card and the projection line.

A shortest distance between the vertex angle of the storage wafer and the projection line is not less than 0.02 mm.

Each of the missing corner edge of the storage card and the projection line includes a first subsegment, the first subsegment is straight. The first subsegment of the storage card is located on an outer side of the first subsegment of the projection line. The vertex angle of the storage wafer is located between the first subsegment of the storage card and the first subsegment of the projection line.

Each of the missing corner edge of the storage card and the projection line includes a second subsegment and a third subsegment that are disposed in an arc shape and that are connected to two ends of the first subsegment of each of the missing corner edge of the storage card and the projection line.

A curvature radius of one of the second subsegment and the third subsegment of the storage card is less than or equal to a curvature radius of one of the second subsegment and the third subsegment of the projection line, and/or a curvature radius of the other of the second subsegment and the third subsegment of the storage card is greater than or equal to a curvature radius of the other of the second subsegment and the third subsegment of the projection line.

The first subsegment of the storage card and the first subsegment of the projection line are disposed in parallel or at an angle to each other.

The standard SIM card is a nano-SIM card, and the storage card further includes two long edges that are straight and that are parallel to each other and two short edges that are straight and that are parallel to each other. The missing corner edge of the storage card is connected to one long edge and one short edge, a vertical distance between the two long edges is 8.8±0.1 mm, and a vertical distance between the two short edges is 12.3±0.1 mm. A vertical distance from a connection point between the missing corner edge of the storage card and the long edge to the short edge connected to the missing corner edge of the storage card is less than 1.65 mm, and/or a vertical distance from a connection point between the missing corner edge of the storage card and the short edge to the long edge connected to the missing corner edge of the storage card is less than 1.65 mm.

According to a second aspect of this application, a storage card is further provided. The storage card includes two long edges that are straight and that are parallel to each other, two short edges that are straight and that are parallel to each other, and a missing corner edge used for connecting a long edge and a short edge. A vertical distance between the two long edges is 8.8±0.1 mm, and a vertical distance between the two short edges is 12.3±0.1 mm. The missing corner edge falls on an outer side of a virtual reference line on the storage card. The virtual reference line is a virtual connection line between a first reference point that is located on the long edge connected to the missing corner edge and that has a vertical distance of 1.65 mm from the short edge connected to the missing corner edge and a second reference point that is located on the short edge connected to the missing corner edge and that has a vertical distance of 1.65 mm from the long edge connected to the missing corner edge. A storage wafer is disposed in the storage card, and a vertex angle of the storage wafer falls between the missing corner edge and the virtual reference line.

A shortest distance between the vertex angle of the storage wafer and the virtual reference line is not less than 0.02 mm.

The missing corner edge of the storage card includes a subsegment, the subsegment is straight. The subsegment is located on an outer side of the virtual reference line. The vertex angle of the storage wafer is located between the subsegment and the virtual reference line.

The subsegment and the virtual reference line are disposed in parallel or at an angle to each other.

Beneficial effects of this application are as follows: At least a part of the missing corner edge of the storage card is located on the outer side of the projection line that is of the missing corner edge of the standard SIM card and that is on the storage card. In this way, the mistake-proof missing corner of the storage card is improved when the storage card shares the card slot with the standard SIM card, so that a storage wafer with a larger area and size can be placed in the storage card, thereby increasing a storage capacity of the storage card.

DETAILED DESCRIPTION OF ILLUSTRATIVE EMBODIMENTS

Terms used throughout this specification and the claims refer to specific components. Persons skilled in the art may understand that an electronic device manufacturer can use different names to refer to a same component. In this specification, components are not distinguished by names, but by functions. In the following specification and claims, the term "including" is an open-ended determiner. Therefore, the term "including" should be interpreted as "including but not limited to . . . ".

To clearly understand this application, a standard SIM card is described first.

Figure 1:
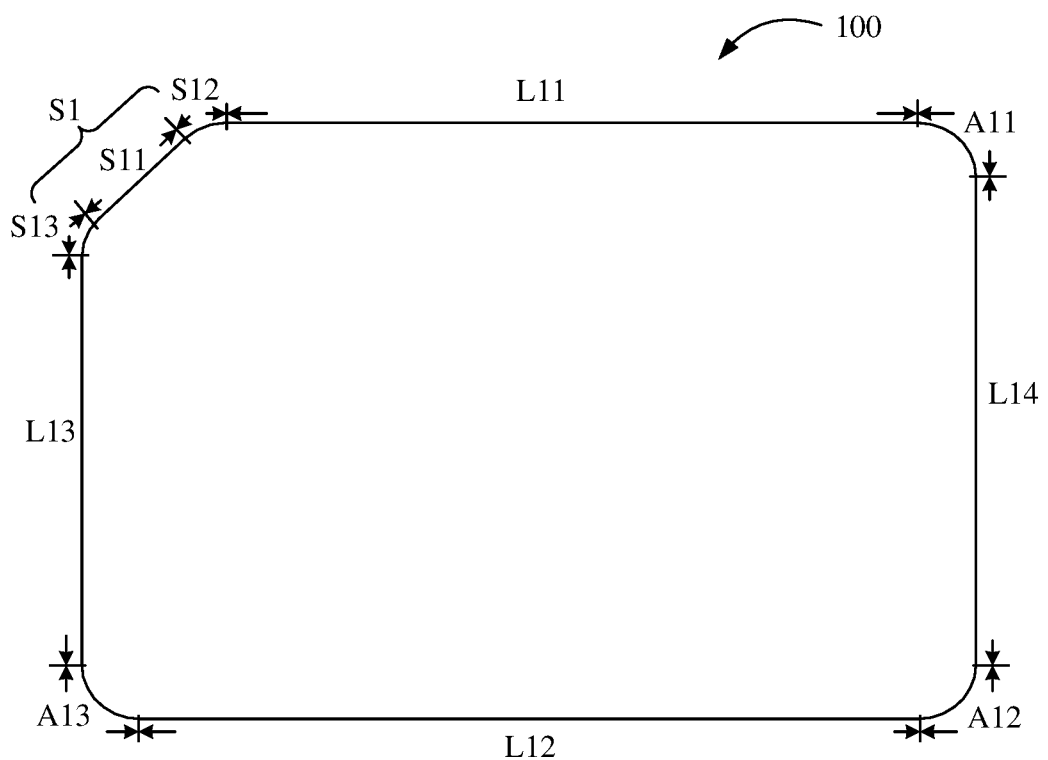
FIG. 1 is a schematic diagram of a standard SIM card.

FIG. 1 is a schematic diagram of a standard SIM card. A missing corner edge S1 is disposed on the standard SIM card 100, and the missing corner edge S1 is used for defining a mistake-proof missing corner. The standard SIM card 100 includes other edges, to be specific, two long edges L11 and L12 and two short edges L13 and L14. The two long edges L11 and L12 are straight and parallel to each other, and the two short edges L13 and L14 are straight and parallel to each other. The missing corner edge S1 of the standard SIM card 100 is connected to the long edge L11 and the short edge L13. In an example, the other edges further include a connection segment A11 between the long edge L11 and the short edge L14, a connection segment A12 between the long edge L12 and the short edge L13, and a connection segment A13 between the long edge L12 and the short edge L14. The connection segments A11, A12, and A13 may be disposed in an arc shape. In other words, an arc shape is disposed between the long edge L11 and the short edge L14, between the long edge L12 and the short edge L13, and between the long edge L12 and the short edge L14.

The missing corner edge S1 of the standard SIM card 100 includes a first subsegment S11, a second subsegment S12, and a third subsegment S13 that are straight, and the second subsegment S12 and the third subsegment S13 are connected to two ends of the first subsegment S11 and are disposed in an arc shape.

In this application, the standard SIM card 100 may be a nano-SIM card. When the standard SIM card 100 is the nano-SIM card, a vertical distance between the two long edges L11 and L12 is 8.8±0.1 mm, and a vertical distance between the two short edges L13 and L14 is 12.3±0.1 mm. A vertical distance from a connection point between the missing corner edge S1 of the standard SIM card 100 and the long edge L11 to the short edge L13 connected to the missing corner edge S1 of the standard SIM card 100 is 1.65±0.1 mm, and a vertical distance from a connection point between the missing corner edge S1 of the standard SIM card 100 and the short edge L13 to the long edge L11 connected to the missing corner edge S1 of the standard SIM card 100 is 1.65±0.1 mm. It should be noted that, in this application, an actual size of the standard SIM card is not limited.

Figure 2:
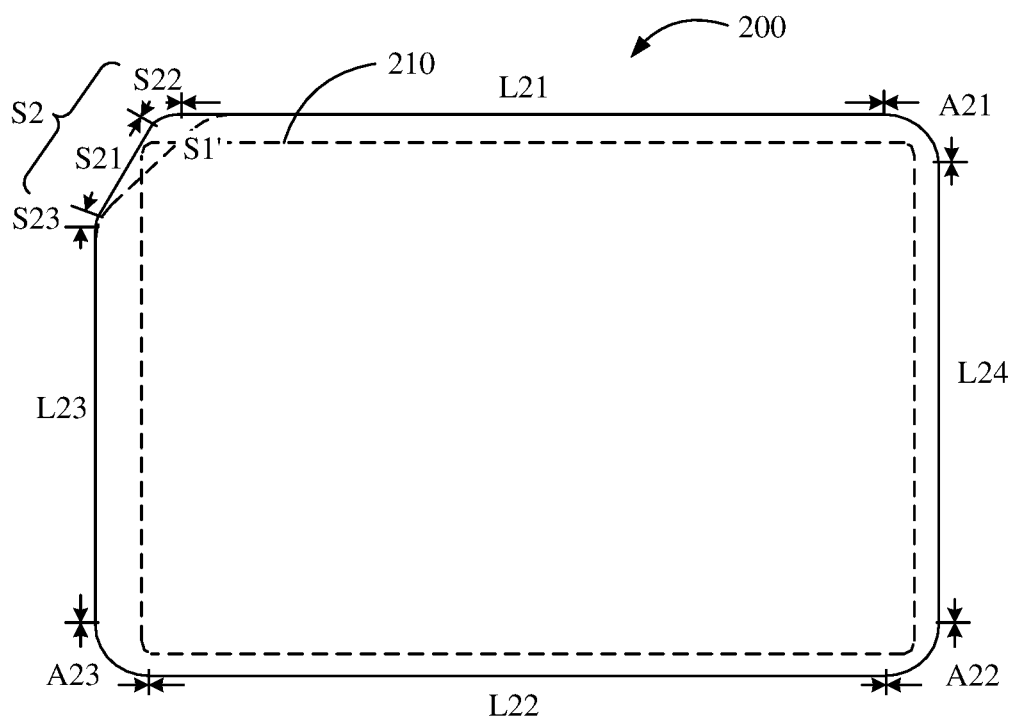
FIG. 2 is a schematic structural diagram of a storage card according to an embodiment of this application.

FIG. 2 is a schematic structural diagram of a storage card according to an embodiment of this application. The storage card 200 can share a card slot with the standard SIM card 100 in the foregoing embodiment. A missing corner edge S2 is disposed on the storage card 200, and the missing corner edge S2 is used for defining a mistake-proof missing corner. Similarly, the storage card 200 includes other edges, to be specific, two long edges L21 and L22 and two short edges L23 and L24. The two long edges L21 and L22 are straight and parallel to each other, and the two short edges L23 and L24 are straight and parallel to each other. The missing corner edge S2 of the storage card 200 is connected to the long edge L21 and the short edge L23. In an example, the other edges further include a connection segment A21 between the long edge L21 and the short edge L24, a connection segment A22 between the long edge L22 and the short edge L23, and a connection segment A23 between the long edge L22 and the short edge L24. The connection segments A21, A22, and A23 may be disposed in an arc shape. In other words, an arc shape is disposed between the long edge L21 and the short edge L24, between the long edge L22 and the short edge L23, and between the long edge L22 and the short edge L24. Because the storage card 200 can share the card slot with the standard SIM card 100 in the foregoing embodiment, the connection segments A21, A22, and A23 of the storage card 200 are the same as the connection segments A11, A12, and A13 of the standard SIM card 100.

When the other edges of the storage card 200 overlap the other edges of the standard SIM card 100, in other words, when the long edges L21 and L22, the two short edges L23 and L24, and the like of the storage card 200 overlap the long edges L11 and L12, the two short edges L13 and L14, and the like of the standard SIM card 100, at least a part of the missing corner edge S2 of the storage card 200 is located on an outer side of a projection line S1' that is of the missing corner edge S1 of the standard SIM card 100 and that is on the storage card 200. In FIG. 2, the projection line S1' that is of the missing corner edge S1 of the standard SIM card 100 and that is on the storage card 200 is indicated by using a dashed line for clear understanding. The projection line S1' is a projection that is of the missing corner edge S1 of the standard SIM card 100 and that is on the storage card 200, and the projection line S1' is actually the missing corner edge S1 of the standard SIM card 100. Therefore, similarly, the projection line S1' includes a first subsegment S11, a second subsegment S12, and a third subsegment S13 that are straight, and the second subsegment S12 and the third subsegment S13 are respectively connected to two ends of the first subsegment S11 and are disposed in an arc shape.

As shown in FIG. 2, a storage wafer 210 is disposed in the storage card 200, and a vertex angle of the storage wafer 210 falls between the missing corner edge S2 of the storage card 200 and the projection line S1'. A capacity of the storage wafer 210 indicates a storage capacity of the storage card 200. A larger size of the storage wafer 210 indicates a larger capacity of the storage wafer 210. Therefore, compared with the standard SIM card 100, the storage wafer 210 disposed in the storage card 200 has a larger size, so that the storage capacity of the storage card 200 becomes larger. It should be noted that, in FIG. 2, the storage wafer 210 is disposed in the storage card 200, and is indicated by using a dashed line. In addition, only one storage wafer is shown. Persons skilled in the art understand that the storage card 200 is not limited to disposing of only one storage wafer. In addition, in FIG. 2, the vertex angle of the storage wafer 210 is shown and disposed in an arc shape. However, this does not constitute a limitation. The vertex angle of the storage wafer 210 may be alternatively disposed as a right angle.

In this embodiment, the mistake-proof missing corner of the storage card 200 is improved when the storage card 200 shares the card slot with the standard SIM card 100, so that a storage wafer with a larger area and size can be placed in the storage card 200, thereby increasing the storage capacity of the storage card 200.

In an embodiment, a shortest distance between the vertex angle of the storage wafer 210 and the projection line S1' is not less than 0.02 mm.

Further, as shown in FIG. 2, the missing corner edge S2 of the storage card 200 includes a first subsegment S21, the first subsegment is straight. The first subsegment S21 of the storage card 200 is located on an outer side of the first subsegment S11 of the projection line S1'. The vertex angle of the storage wafer 210 is located between the first subsegment S21 of the storage card 210 and the first subsegment S11 of the projection line S1'. That is, a surface area of the storage card 200 is greater than a surface area of the standard SIM card.

As shown in FIG. 2, the missing corner edge S2 of the storage card 200 further includes a second subsegment S22 and a third subsegment S23, and the second subsegment S22 and the third subsegment S23 are respectively connected to two ends of the first subsegment S21 of the storage card 200 and are disposed in an arc shape. In an example, a curvature radius of the second subsegment S22 of the storage card 200 is equal to a curvature radius of the second subsegment S12 of the projection line S1', and a curvature radius of the third subsegment S23 of the storage card 200 is equal to a curvature radius of the third subsegment S13 of the projection line S1'. In another example, a curvature radius of the second subsegment S22 of the storage card 200 is less than a curvature radius of the second subsegment S12 of the projection line S1', and a curvature radius of the third subsegment S23 of the storage card 200 is greater than a curvature radius of the third subsegment S13 of the projection line S1'. In still another example, a curvature radius of the second subsegment S22 of the storage card 200 is greater than a curvature radius of the second subsegment S12 of the projection line S1', and a curvature radius of the third subsegment S23 of the storage card 200 is less than a curvature radius of the third subsegment S13 of the projection line S1'.

In an embodiment, as shown in FIG. 2, the first subsegment S21 of the storage card 200 and the first subsegment S11 of the projection line S1' are disposed at an angle to each other. Further, in an example, the third subsegment S23 of the missing corner edge S2 of the storage card 200 partially overlaps a curvature radius of the third subsegment S13 of the missing corner edge S1 of the standard SIM card 100. In another example, based on an actual design requirement, the second subsegment S22 of the missing corner edge S2 of the storage card 200 partially overlaps the second subsegment S12 of the missing corner edge S1 of the standard SIM card 100.

In another embodiment, the first subsegment S21 of the storage card 200 and the first subsegment S11 of the projection line S1' are parallel to each other. In this case, the third subsegment S23 of the missing corner edge S2 of the storage card 200 and the third subsegment S13 of the missing corner edge S1 of the standard SIM card 100 are roughly parallel to each other. Similarly, the second subsegment S22 of the missing corner edge S2 of the storage card 200 and the second subsegment S12 of the missing corner edge S1 of the standard SIM card 100 are roughly parallel to each other.

Further, when the standard SIM card 100 is a nano-SIM card, because the storage card 200 shares the card slot with the standard SIM card 100, a vertical distance between the two long edges L21 and L22 of the storage card 200 is 8.8±0.1 mm, and a vertical distance between the two short edges L23 and L24 is 12.3±0.1 mm.

In an example, a vertical distance from a connection point between the missing corner edge S2 of the storage card 200 and the long edge L21 to the short edge L23 connected to the missing corner edge S2 of the storage card 200 is less than 1.65 mm, and a vertical distance from a connection point between the missing corner edge S2 of the storage card 200 and the short edge L23 to the long edge L21 connected to the missing corner edge S2 of the storage card 200 is less than 1.65 mm. In other words, both a vertical distance from one end of the missing corner edge S2 of the storage card 200 to the corresponding long edge L21 and a vertical distance from the other end of the missing corner edge S2 of the storage card 200 to the corresponding short edge L23 are less than 1.65 mm. In another example, a vertical distance from a connection point between the missing corner edge S2 of the storage card 200 and the long edge L21 to the short edge L23 connected to the missing corner edge S2 of the storage card 200 is less than 1.65 mm, or a vertical distance from a connection point between the missing corner edge S2 of the storage card 200 and the short edge L23 to the long edge L21 connected to the missing corner edge S2 of the storage card 200 is less than 1.65 mm. In other words, one of a vertical distance from one end of the missing corner edge S2 of the storage card 200 to the corresponding long edge L21 and a vertical distance from the other end of the missing corner edge S2 of the storage card 200 to the corresponding short edge L23 is less than 1.65 mm.

Figure 3:
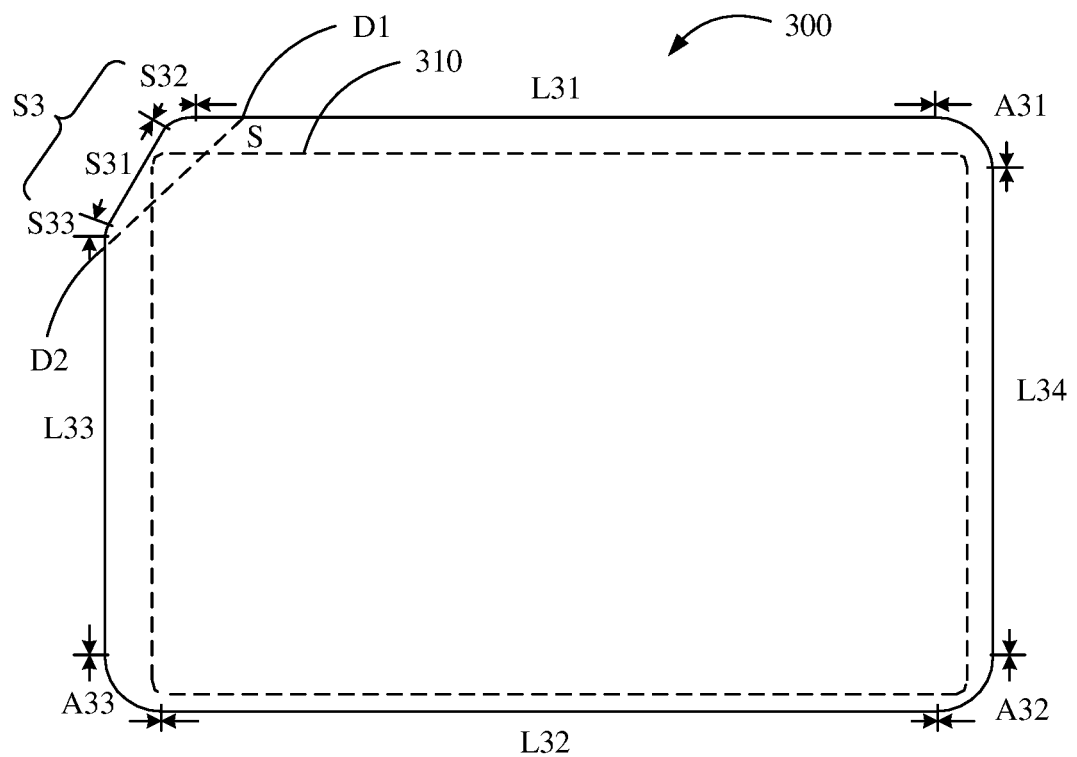
FIG. 3 is a schematic structural diagram of a storage card according to an embodiment of this application.

This application further provides a storage card. FIG. 3 is a schematic diagram of the storage card according to an embodiment of this application. The storage card 300 may be referred to as a nano storage card.

The storage card 300 includes two long edges L31 and L32 that are straight and that are parallel to each other, two short edges L33 and L34 that are straight and that are parallel to each other, and a missing corner edge S3 used for connecting the long edge L31 and the short edge L33. A vertical distance between the two long edges L31 and L32 is 8.8±0.1 mm, and a vertical distance between the two short edges L33 and L34 is 12.3±0.1 mm. The missing corner edge S3 falls on an outer side of a virtual reference line S on the storage card 300, and the virtual reference line S is a virtual connection line between a first reference point D1 that is located on the long edge L3 connected to the missing corner edge S3 and that has a vertical distance of 1.65 mm from the short edge L33 connected to the missing corner edge S3 and a second reference point D2 that is located on the short edge L33 connected to the missing corner edge S3 and that has a vertical distance of 1.65 mm from the long edge L31 connected to the missing corner edge S3.

A storage wafer 310 is disposed in the storage card 300, and a vertex angle of the storage wafer 310 falls between the missing corner edge S3 and the virtual reference line S. A capacity of the storage wafer 310 indicates a storage capacity of the storage card 300. A larger size of the storage wafer 310 indicates a larger capacity of the storage wafer 310. Therefore, compared with the virtual reference line S, the storage wafer 310 disposed in the storage card 200 has a larger size, so that the storage capacity of the storage card 200 becomes larger. It should be noted that, in FIG. 3, the storage wafer 210 is disposed in the storage card 200, and is indicated by using a dashed line. In addition, only one storage wafer is shown. Persons skilled in the art understand that the storage card 300 is not limited to disposing of only one storage wafer. In addition, in FIG. 3, the vertex angle of the storage wafer 310 is shown and disposed in an arc shape. However, this does not constitute a limitation. The vertex angle of the storage wafer 310 may be alternatively disposed as a right angle.

In this embodiment, a mistake-proof missing corner of the storage card 300 is improved, so that a storage wafer with a larger area and size can be disposed in the storage card 300, thereby increasing the storage capacity of the storage card 300.

As shown in FIG. 3, the storage card 300 further includes a connection segment A31 between the long edge L31 and the short edge L3, a connection segment A32 between the long edge L32 and the short edge L33, and a connection segment A33 between the long edge L32 and the short edge L34. The connection segments A31, A32, and A33 may be disposed in an arc shape. In other words, an arc shape is disposed between the long edge L31 and the short edge L34, between the long edge L32 and the short edge L33, and between the long edge L32 and the short edge L34.

In an embodiment, a shortest distance between the vertex angle of the storage wafer 310 and the virtual reference line S is not less than 0.02 mm.

Further, as shown in FIG. 3, the missing corner edge S3 of the storage card 300 includes a first subsegment S31, the first subsegment S31 is straight. The first subsegment S31 of the storage card 300 is located on an outer side of a first subsegment S31 of the virtual reference line S. The vertex angle of the storage wafer 210 is located between the first subsegment S31 of the storage card 300 and the virtual reference line S.

As shown in FIG. 3, the missing corner edge S3 of the storage card 300 includes a second subsegment S32 and a third subsegment S33, and the second subsegment S32 and the third subsegment S33 are respectively connected to two ends of the first subsegment S31 of the storage card 300 and are disposed in an arc shape.

In an embodiment, as shown in FIG. 3, the first subsegment S31 of the storage card 300 and the virtual reference line S are disposed at an angle to each other.

In another embodiment, the first subsegment S31 of the storage card 300 and the virtual reference line S are parallel to each other.

Figure 4:
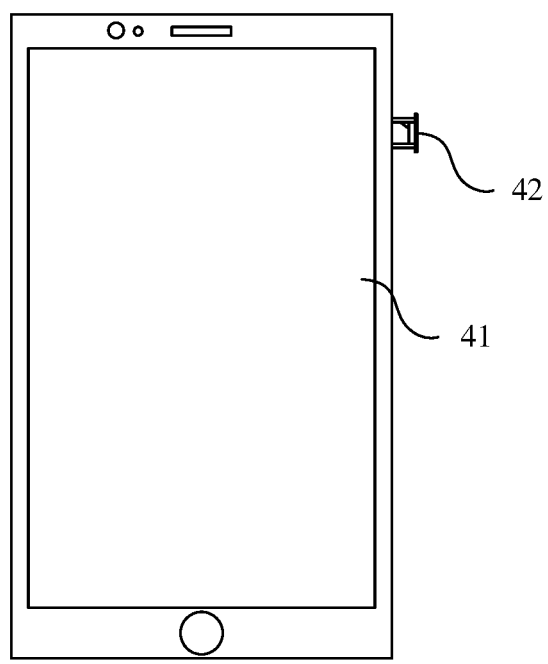
FIG. 4 is a schematic structural diagram of a mobile electronic device according to an embodiment of this application.

FIG. 4 is a schematic structural diagram of a mobile electronic device according to an embodiment of this application. The electronic device includes a device body 41 and a card tray 42 that can be built in the device body 41.

Figure 5:
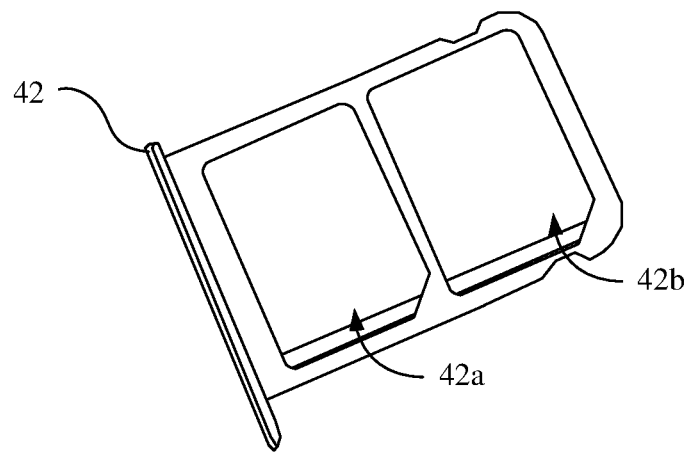
FIG. 5 is a schematic structural diagram of a card tray in a mobile electronic device according to an embodiment of this application.

FIG. 5 is a schematic structural diagram of a card tray in a mobile electronic device according to an embodiment of this application. The card tray 42 includes a SIM card slot 42a and a storage card slot 42b. A shape of the SIM card slot 42a is the same as that of the storage card slot 42b. The storage card slot 42b is used for accommodating the storage card 200 or 300 provided in the foregoing embodiment.

It may be understood that, in an embodiment, a shape of the SIM card slot 42a is the same as that of the storage card slot 42b. In this way, the storage card 200 or 300 in the foregoing embodiment shares a same card slot with the standard SIM card 100. Because the storage card 200 or 300 and the standard SIM card 100 have different mistake-proof missing corners, an order of the SIM card slot 42a and an order of the storage card slot 42b are interchangeable, and are subject to adaptation to the storage card 200 or 300. Optionally, a corresponding mark may be printed on the card tray 42, so that a subscriber can correctly place the SIM card slot 42a and the storage card slot 42b during installation.

In another embodiment, two card slots may further be horizontally placed, to be specific, a short edge of the SIM card slot 42a is adjacent to a short edge of the storage card slot 42b.

The SIM card slot and the storage card slot on the built-in card tray in the mobile electronic device provided in this application have the same shape, so that a size of the storage card slot is reduced. In this way, an area of a circuit board inside the electronic device may correspondingly be reduced, and space inside the electronic device is reduced, thereby facilitating thinning of the electronic device.

Persons skilled in the art easily learn that many modifications and changes can be made to the apparatus and method while teaching content of this application is maintained. Therefore, the foregoing disclosed content should be considered as being limited only by the scope of the appended claims.

What is claimed is:

1. A storage card, comprising:
a storage wafer;
wherein the storage card comprises a first edge, a second edge, a third edge and a fourth edge;
wherein the first edge is opposite to the third edge, the second edge is opposite to the fourth edge, and the first edge is adjacent to the second edge and the fourth edge;
wherein a corner is disposed between the first edge and the fourth edge;
wherein a connection point between the corner and the first edge is a first connection point, and a distance between the first connection point and the fourth edge is a first distance; and
wherein a connection point between the corner and the fourth edge is a second connection point, a distance between the second connection point and the first edge is a second distance, and at least one of the first distance or the second distance is less than 1.65 mm.

2. The storage card of claim 1, wherein:
the first edge comprises a first point, and a distance between the first point and the fourth edge is 1.65 mm;
the fourth edge comprises a second point, wherein a distance between the second point and the first edge is 1.65 mm;
a first connection line is between the first point and the second point;
a first area is surrounded by the first connection line and an edge of the corner in a plan view; and
at least part of the storage wafer is located in the first area.

3. The storage card of claim 2, wherein the first point and the first connection point overlap, or the second point and the second connection point overlap.

4. The storage card of claim 2, wherein the at least part of the storage wafer comprises a vertex angle of the storage wafer, and a distance between the vertex angle and the first connection line is not less than 0.02 mm.

5. The storage card of claim 2, wherein:
the edge of the corner comprises a first subsegment, a second subsegment and a third subsegment;
the first subsegment is straight, the second subsegment and the third subsegment are arc shaped, and the first subsegment is disposed between the second subsegment and the third subsegment; and
the first subsegment is parallel to the first connection line.

6. The storage card of claim 1, wherein a distance between the first edge and the third edge is 12.3±0.1 mm, and a distance between the second edge and the fourth edge is 8.8±0.1 mm.

7. The storage card of claim 1, wherein a surface area of the storage card is larger than a surface area of a subscriber identity module (SIM) card.

8. The storage card of claim 1, wherein at least one of the following is provided with an arc connection:
   a connection portion between the first edge and the second edge;
   a connection portion between the second edge and the third edge;
   a connection portion between the third edge and the fourth edge;
   a connection portion between the fourth edge and the corner; or
   a connection portion between the first edge and the corner.

9. An electronic device, comprising:
   a storage card; and
   a first card slot, wherein the first card slot is configured to receive the storage card;
   wherein the storage card comprises a first edge, a second edge, a third edge and a fourth edge;
   wherein the first edge is opposite to the third edge, the second edge is opposite to the fourth edge, the first edge is adjacent to the second edge and the fourth edge;
   a corner is disposed between the first edge and the fourth edge;
   a first connection point is between the corner and the first edge, and a distance between the first connection point and the fourth edge is a first distance; and
   a second connection point is between the corner and the fourth edge, a distance between the second connection point and the first edge is a second distance, and at least one of the first distance or the second distance is less than 1.65 mm.

10. The electronic device of claim 9, wherein:
    the first edge comprises a first point, and a distance between the first point and the fourth edge is 1.65 mm;
    the fourth edge comprises a second point, and a distance between the second point and the first edge is 1.65 mm;
    a first connection line is between the first point and the second point;
    a first area is surrounded by the first connection line and an edge of the corner; and
    the storage card further comprises a storage wafer, and at least part of the storage wafer is located in the first area.

11. The electronic device of claim 10, wherein the at least part of the storage wafer comprises a vertex angle of the storage wafer, a distance between the vertex angle and the first connection line is not less than 0.02 mm.

12. The electronic device of claim 10, wherein the edge of the corner comprises a first subsegment, a second subsegment and a third subsegment;
    the first subsegment is straight, the second subsegment and the third subsegment are arc shaped, the first subsegment is disposed between the second subsegment and the third subsegment; and
    wherein the first subsegment is parallel to the first connection line.

13. The electronic device of claim 10, wherein the first point and the first connection point overlap, or the second point and the second connection point overlap.

14. The electronic device of claim 9, wherein a distance between the first edge and the third edge is 12.3±0.1 mm, and a distance between the second edge and the fourth edge is 8.8±0.1 mm.

15. The electronic device of claim 9, wherein a surface area of the storage card is larger than a surface area of a subscriber identity module (SIM) card.

16. The electronic device of claim 9, wherein at least one of the following is provided with an arc connection:
    a connection portion between the first edge and the second edge;
    a connection portion between the second edge and the third edge;
    a connection portion between the third edge and the fourth edge;
    a connection portion between the fourth edge and the corner; or
    a connection portion between the first edge and the corner.

17. The electronic device of claim 9, wherein the first card slot is further configured to receive a subscriber identity module (SIM) card.

18. The electronic device of claim 17, wherein the SIM card is a nano SIM card.

19. The electronic device of claim 9, further comprising a second card slot, wherein the second card slot is configured to receive a subscriber identity module (SIM) card, and a shape of the second card slot is the same with a shape of the first card slot.

20. The electronic device of claim 19, further comprising a card tray, wherein the first card slot and the second card slot are arranged in the card tray, the card tray comprises identification information, and wherein the identification information identifies a location of the first card slot or a location of the second card slot.

* * * * *